United States Patent
Qi et al.

(10) Patent No.: US 12,309,115 B2
(45) Date of Patent: May 20, 2025

(54) NODE CONFLICT DETECTION METHOD AND APPARATUS, DEVICE, AND STORAGE MEDIUM

(71) Applicant: ESPRESSIF SYSTEMS (SHANGHAI) CO., LTD., Shanghai (CN)

(72) Inventors: Yuexia Qi, Shanghai (CN); Jiangjian Jiang, Shanghai (CN)

(73) Assignee: ESPRESSIF SYSTEMS (SHANGHAI) CO., LTD., Shanghai (CN)

( * ) Notice: Subject to any disclaimer, the term of this patent is extended or adjusted under 35 U.S.C. 154(b) by 871 days.

(21) Appl. No.: 17/601,374

(22) PCT Filed: Feb. 26, 2020

(86) PCT No.: PCT/CN2020/076762
§ 371 (c)(1),
(2) Date: Oct. 4, 2021

(87) PCT Pub. No.: WO2020/199797
PCT Pub. Date: Oct. 8, 2020

(65) Prior Publication Data
US 2022/0166747 A1 May 26, 2022

(30) Foreign Application Priority Data
Apr. 4, 2019 (CN) .......................... 201910272479.7

(51) Int. Cl.
*G06F 21/55* (2013.01)
*H04L 61/5046* (2022.01)
(Continued)

(52) U.S. Cl.
CPC ......... *H04L 61/5046* (2022.05); *H04W 8/005* (2013.01); *H04W 84/20* (2013.01)

(58) Field of Classification Search
None
See application file for complete search history.

(56) References Cited

U.S. PATENT DOCUMENTS 9,772,787 B2 * 9/2017 Oikarinen ............... G06F 3/064
2004/0028016 A1 * 2/2004 Billhartz ............. H04L 63/1416
370/389
(Continued)

FOREIGN PATENT DOCUMENTS

WO    WO 2013/007344 A1    1/2013

OTHER PUBLICATIONS

International Search Report from WO 2020/199797 A1 dated May 14, 2020.
(Continued)

*Primary Examiner* — Sithu Ko
(74) *Attorney, Agent, or Firm* — Aird & McBurney LP (57) ABSTRACT

The present disclosure discloses a node conflict detection method, apparatus, terminal, and storage medium. First, if a node conflict detection instruction is detected, first physical address information of an external device corresponding to a node outside the network to which the first terminal belongs is acquired, and then a conflict detection result of the network to which the first terminal belongs is determined according to second physical address information of an external device corresponding to the network to which the first terminal belongs and the first physical address information, to determine whether the network to which the first terminal belongs has a node conflict, thereby implementing effective root node conflict detection in a wireless mesh network.

10 Claims, 5 Drawing Sheets

(51) Int. Cl.
*H04W 8/00* (2009.01)
*H04W 84/20* (2009.01)

(56) References Cited

U.S. PATENT DOCUMENTS

| | | | |
|---|---|---|---|
| 2009/0199291 A1* | 8/2009 | Hayasaka | H04L 63/0227 726/14 |
| 2010/0214959 A1* | 8/2010 | Kuehnel | H04L 61/5046 370/255 |
| 2012/0131153 A1* | 5/2012 | Schmidt | H04L 41/08 709/220 |
| 2012/0173646 A1 | 7/2012 | Lan | |
| 2017/0004048 A1* | 1/2017 | Adkins | G06F 16/128 |
| 2017/0060898 A1* | 3/2017 | Lu | G06F 3/0689 |
| 2018/0174406 A1* | 6/2018 | Arashi | G08B 3/10 |
| 2020/0213352 A1* | 7/2020 | Fainberg | H04W 12/122 |

OTHER PUBLICATIONS

CN109951871B CN Priority (with EN cover page).
CN109951871A cited in ISR (with EN cover page).
CN108616608A cited in ISR (with EN cover page).
CN106992891A cited in ISR (with EN cover page).
CN102857907A cited in ISR (with EN cover page).
CN102752210A cited in Chinese Office Action dated Mar. 20, 2020 (with EN cover page).
CN102301762A cited in ISR (with EN cover page).
CN101291350A cited in ISR (with EN cover page).
CN101110712A cited in ISR (with EN cover page).
China National Intellectual Property Administration, Office Action and Search Report from corresponding Chinese Application No. 201910272479.7, Mar. 20, 2020, with English Machine Translation of body of Office Action.
China National Intellectual Property Administration, Office Action from corresponding Chinese Application No. 201910272479.7, Nov. 3, 2020, with English Machine Translation of body of Office Action.

* cited by examiner

NODE CONFLICT DETECTION METHOD AND APPARATUS, DEVICE, AND STORAGE MEDIUM

TECHNICAL FIELD

The embodiments of the present disclosure relate to the technical field of mesh networks, and in particular to a node conflict detection method, apparatus, terminal, and storage medium.

BACKGROUND ART

Wireless mesh network, also known as "multi-hop" network, is a new wireless network technology completely different from traditional wireless networks, and terminals in the wireless mesh network are called nodes.

Terminals in the network may be regarded as nodes, and form parent/child node relationships according to their respective levels in the mesh network, so as to forward data to each other; and a root node, as a sink of the mesh network, may be connected to the Internet via a router, and in turn communicate with an external network.

In the ad hoc networking process of wireless mesh network, only one root node is allowed in a network containing one router. However, all nodes in the wireless mesh network are configured with router information, and all nodes which are able to scan and find the router may be directly connected to the router and act as a root node of the network after power-on. The terminals in the network usually compete for the root node based on the strengths of the signal of their connections to the router. In general, multiple root nodes are apt to appear in a complicated network environment. For example, when multiple routers with the same name but different Media Access Control (MAC) addresses are around, and all devices are configured with only the router name but without the MAC addresses, a plurality of root nodes may appear in the network. In a normal condition, the plurality of root nodes may correspond to different routers; however, it is abnormal if there are more than one root node under the same router, that is, a root node conflict exists in the mesh network, which may cause that the communication in the mesh network is unable to be performed normally.

SUMMARY OF THE INVENTION

The present disclosure provides a node conflict detection method, apparatus, terminal, and storage medium, so as to implement effective detection of root node conflicts in a wireless mesh network.

In a first aspect, embodiments of the present disclosure provide a node conflict detection method, which is applied to a first terminal acting as a node in a wireless mesh network and includes:

if a node conflict detection instruction is detected, acquiring first physical address information of an external device corresponding to a node outside the network to which the first terminal belongs; and determining a conflict detection result of the network to which the first terminal belongs according to second physical address information of an external device corresponding to the network to which the first terminal belongs and the first physical address information.

In a second aspect, embodiments of the present disclosure further provide a node conflict detection apparatus, which is configured in a first terminal acting as a node in a wireless mesh network, and includes:

a first acquisition module configured to, if a node conflict detection instruction is detected, acquire first physical address information of an external device corresponding to a node outside the network to which the first terminal belongs; and a determination module configured to determine a conflict detection result of the network to which the first terminal belongs according to second physical address information of an external device corresponding to the network to which the first terminal belongs and the first physical address information.

In a third aspect, embodiments of the present disclosure further provide a terminal, which includes:

one or more processors; and a storage device, used for storing one or more programs, when the one or more programs being executed by the one or more processors, causing the one or more processors to carry out the node conflict detection method as described in the first aspect.

In a fourth aspect, embodiments of the present disclosure further provide a computer readable storage medium, storing a computer program thereon, and when the computer program is executed by one or more processors, causing the one or more processors to carry out the node conflict detection described in the above first aspect.

According to a node conflict detection method, apparatus, terminal, and storage medium provided by embodiments of the present disclosure, first, if a node conflict detection instruction is detected, first physical address information of an external device corresponding to a node outside the network to which the first terminal belongs is acquired, and then a conflict detection result of the network to which the first terminal belongs is determined according to second physical address information of an external device corresponding to the network to which the first terminal belongs and the first physical address information. According to the technical solution provided by the embodiments, after a received instruction is detected, second physical address information of an external device corresponding to the network to which the first terminal belongs is compared with first physical address information of an external device corresponding to a node outside the network to which the first terminal belongs to determine whether a node conflict exists in the network to which the first terminal belongs, thereby implementing effective root node conflict detection in a wireless mesh network.

DESCRIPTION OF THE PREFERRED EMBODIMENTS

The present disclosure will be further described in detail with reference to the drawings and embodiments. It will be understood that the specific embodiments described herein are only used for illustrative purpose rather than limiting the present disclosure. It should be also noted that for convenience of description, only relevant portions, but not all, of the structures relating to the present disclosure are shown in the drawings.

First Embodiment

Figure 1:
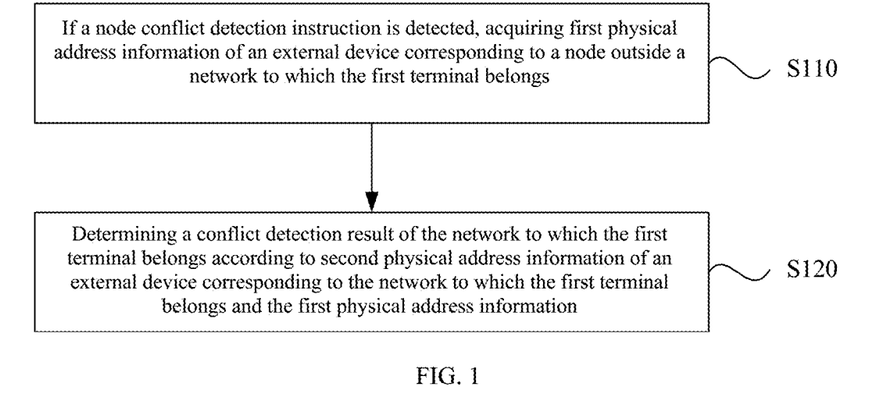
FIG. 1 is a flow chart of a node conflict detection method provided in a first embodiment of the present disclosure.

FIG. 1 is a flow chart of a node conflict detection method provided in the first embodiment of the present disclosure. The present embodiment may be applicable to the root node conflict detection in a wireless mesh network, and the method may be performed by a node conflict detection apparatus. Further, the method is applied to a first terminal acting as a node in a wireless mesh network.

Specifically, as shown in FIG. 1, the node conflict detection method provided in the present embodiment mainly includes the following steps.

In step S110, if a node conflict detection instruction is detected, first physical address information of an external device corresponding to a node outside the network to which the first terminal belongs is acquired.

In the present embodiment, a node conflict refers to a conflict which may occur when more than one root node exists in a network containing one router, that is, the node conflict may occur when the network containing one router has two or more root nodes. It should be noted that the node conflict detection method provided in the present embodiment is implemented by the node conflict detection apparatus configured in the first terminal, which may be any terminal device in a wireless mesh network. Another terminal refers to other terminal devices except the first terminal in the wireless mesh network.

An external device may be understood as a device connected to the Internet in the wireless mesh network. In the present embodiment, the external device is preferably a router. The physical address information refers to the address used to determine the location of an external device, and is also known as a Media Access Control address, a Local Area Network address, an Ethernet address, or a MAC address.

Furthermore, the first physical address information of the external device may be obtained by receiving and parsing a beacon frame broadcasted by the terminal or node outside the network to which the first terminal belongs.

The node conflict detection means that the first terminal detects whether a root node conflict exists in a wireless mesh network; and a node conflict detection instruction may be understood as an instruction to determine whether the first terminal in the wireless mesh network detects a node conflict, that is, an instruction for the first terminal in the wireless mesh network to detect whether there is a root node conflict in the network. Here, the trigger mode of the node conflict detection instruction may be set according to the actual situation. For example, a trigger button may be set; when the trigger button is clicked, it is determined that a node conflict detection instruction is detected, wherein the trigger button may be a physical button in the first terminal. For another example, the following settings may be performed: a node conflict detection instruction is automatically generated and detected after the first terminal completes executing a set function.

Furthermore, after a node conflict detection instruction is detected, a beacon frame broadcasted by the terminal or node outside the network to which the first terminal belongs is acquired and parsed to obtain the first physical address information carried therein.

In step S120, a conflict detection result of the network to which the first terminal belongs may be determined according to second physical address information of an external device corresponding to the network to which the first terminal belongs and the first physical address information.

Figure 2:
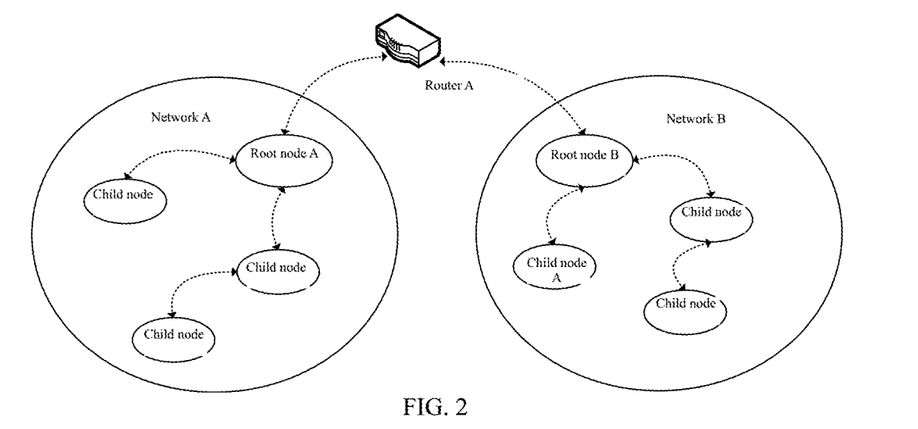
FIG. 2 is a schematic diagram of a wireless mesh network provided in the first embodiment of the present disclosure.

In the present embodiment, the external device corresponding to the network to which the first terminal belongs may be understood as a router used by a root node in the wireless mesh network to which the first terminal belongs to communicate with the external network. FIG. 2 is a schematic diagram of a wireless mesh network provided in the first embodiment of the present disclosure. For example, as shown in FIG. 2, if a child node A is the first terminal, then other child nodes in a network A and a network B are other terminals. The network to which the child node A belongs is the network B, and the external device corresponding to the network to which the first terminal belongs refers to a router A corresponding to the network B to which the child node A belongs. The second physical address information refers to the physical address information of the router A, and the first physical address information refers to the physical address information broadcasted by other child nodes. In the wireless mesh network shown in FIG. 2, the first physical address information may be understood as the physical address information of the router A.

Furthermore, whether the second physical address information of the external device corresponding to the network to which the first terminal belongs is the same as the first physical address information may be determined. If the second physical address information is the same as the first physical address information, it may be determined that a node conflict exists as the conflict detection result of the network to which the first terminal belongs. If the second physical address information is different from the first physical address information, it may be determined that no node conflict exists as the conflict detection result of the network to which the first terminal belongs.

Furthermore, when the child node A is considered as a first terminal, the second physical address information of the external device corresponding to the network to which the first terminal belongs is the physical address information of the router A, and the first physical address information of the external device corresponding to the node outside the network to which the first terminal belongs is also the physical address information of the router A, that is, the second physical address information is the same as the first physical address information, indicating that a root node A and a root node B are connected to the router A, in other words, two root nodes exist in the wireless mesh network formed by the router A. Hence, it may be determined that a root node conflict exists as the conflict detection result of the network to which the first terminal belongs.

Figure 3:
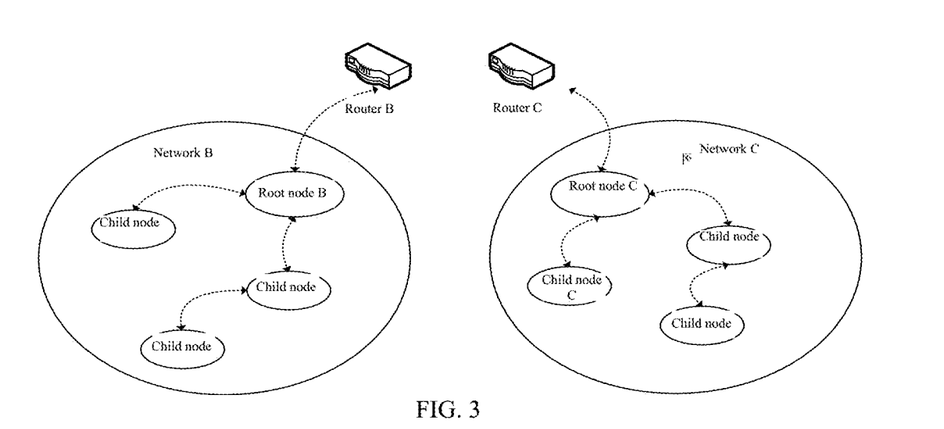
FIG. 3 is a schematic diagram of another wireless mesh network provided in the first embodiment of the present disclosure.

FIG. 3 is a structural schematic diagram of another wireless mesh network provided in the first embodiment of the present disclosure. As shown in FIG. 3, when a child node C is considered as a first terminal, the second physical address information of the external device corresponding to the network to which the first terminal belongs is the physical address information of a router C, and the first physical address information of the external device corresponding to a node outside the network to which the first terminal belongs is also the physical address information of a router B, that is, the second physical address information is different from the first physical address information. It is determined that a root node B is connected to the router B and a root node C is connected to the router C; in other words, one root node exists in a wireless mesh network composed of the router C and another root node exists in a wireless mesh network composed of the router B. Hence, it may be determined that a root node conflict does not exist as the conflict detection result of the network to which the first terminal belongs.

According to the node conflict detection method provided by the embodiment of the present disclosure, first, if a node conflict detection instruction is detected, first physical address information of an external device corresponding to a node outside the network to which the first terminal belongs a is acquired, and then a conflict detection result of the network to which the first terminal belongs is determined according to second physical address information of an external device corresponding to the network to which the first terminal belongs and the first physical address information. According to the technical solution provided by the embodiment, after a received instruction is detected, second physical address information of an external device corresponding to the network to which the first terminal belongs is compared with first physical address information of an external device corresponding to a node outside the network to which the first terminal belongs to determine whether a node conflict exists in the network to which the first terminal belongs, thereby implementing effective root node conflict detection in a wireless mesh network.

Second Embodiment

Figure 4:
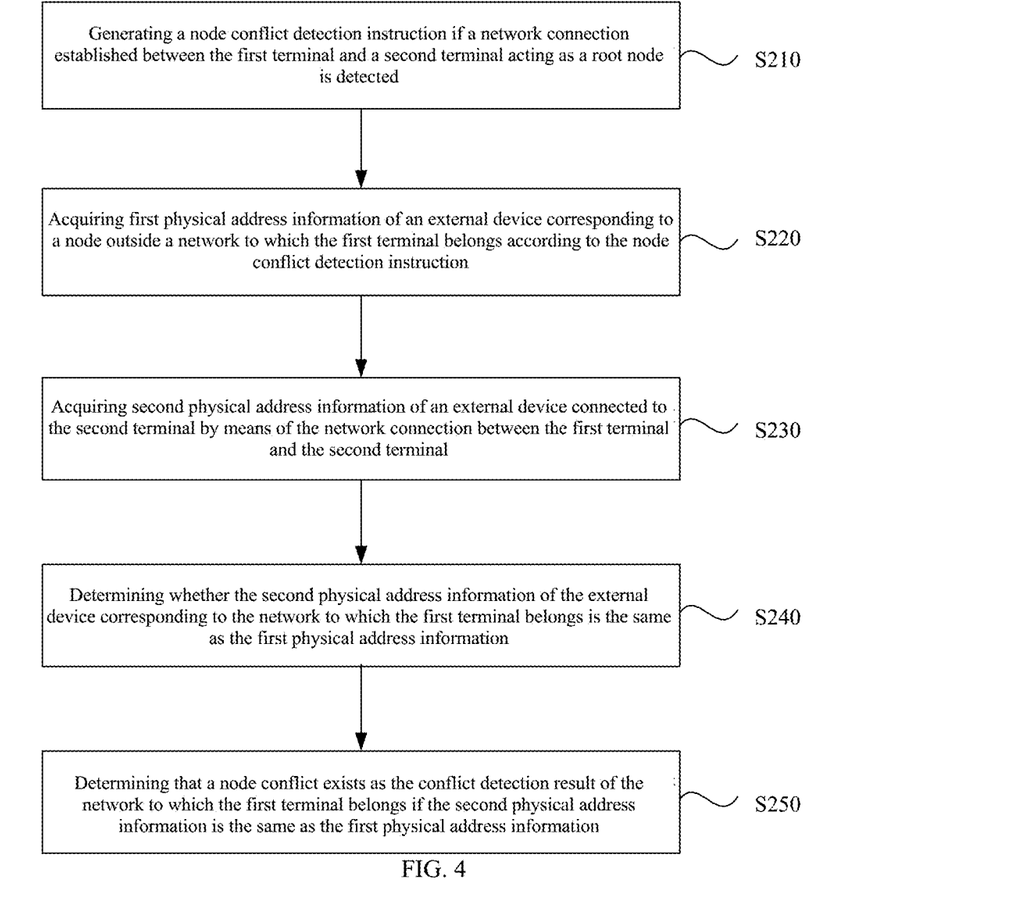
FIG. 4 is a flow chart of a node conflict detection method provided in a second embodiment of the present disclosure.

FIG. 4 is a flow chart of a node conflict detection method provided in the second embodiment of the present disclosure. On the basis of the above embodiment, the present embodiment further optimizes the node conflict detection method. As shown in FIG. 4, the optimized node conflict detection method mainly includes the following steps.

In step S210, a node conflict detection instruction may be generated if a network connection established between the first terminal and a second terminal acting as a root node is detected.

In the present embodiment, the root node may be understood or interpreted as an only sink for a wireless mesh network to communicate with an external network, and the root node supports the entire wireless mesh network and forwards data inside the wireless mesh network to the external network. The second terminal is a root node device in the wireless mesh network. In the present embodiment, the first terminal is preferably a device that joins a wireless mesh network by means of a root node, that is, the first terminal refers to a device that establishes a network connection with a root node and is a child node of the root node.

In the present embodiment, detecting a network connection between the first terminal and the second terminal acting as a root node may be understood as that, when it is detected that the first terminal joins the wireless mesh network by means of the second terminal, the first terminal generates a node conflict detection instruction to detect whether a root node conflict occurs in the wireless mesh network.

In step S220, first physical address information of an external device broadcasted by a third terminal acting as a root node may be acquired according to the node conflict detection instruction.

It should be noted that the root node in the wireless mesh network may broadcast a beacon frame at a preset time interval, which carries the physical address information of the router connected with the root node, and the third terminal is a root node device in the wireless mesh network. It should be noted that the first terminal may scan and obtain a beacon frame broadcasted by the third terminal.

In the present embodiment, after detected a node conflict detection instruction, the first terminal may scan and find a third terminal acting as a root node, receive a first beacon frame broadcasted by the third terminal acting as a root node, and parse the first beacon frame to obtain the first physical address information of the external device.

Furthermore, in the present embodiment, if the first terminal does not acquire the first physical address information of the external device broadcasted by the third terminal, that is, if the first terminal does not receive a beacon frame broadcasted by the third terminal, it is determined that the first terminal cannot scan and find the third terminal, and thus no root node conflict exists in the network to which the first terminal belongs.

In step S220', third physical address information of an external device broadcasted by a fourth terminal acting as an intermediate node and first root node physical address information may be acquired according to the node conflict detection instruction, in which the first root node physical address information is the physical address information of the root node in a network to which the fourth terminal belongs. If the second root node physical address information corresponding to the first terminal is different from the first root node physical address information, the third physical address information is used as the first physical address information.

In the present embodiment, the intermediate node may be understood as a node with forwarding function in the whole wireless mesh network, which receives data sent from a root node and forwards the data to a leaf node, and also receives data of a leaf node and forwards the data to the root node. The fourth terminal is an intermediate node in the wireless mesh network.

In the present embodiment, since the first terminal may access the wireless mesh network by means of a root node, it should be determined first whether the second root node physical address information corresponding to the first terminal is the same as the first root node physical address information broadcasted by the fourth terminal. If the second root node physical address information corresponding to the first terminal is the same as the first root node physical address information, it means that the first terminal and the fourth terminal belong to the same wireless mesh network, that is, the first terminal and the fourth terminal share a same root node, and the wireless mesh network has only one root node. Therefore, no root node conflict exists.

In step S230, second physical address information of an external device connected to the second terminal may be acquired by means of the network connection between the first terminal and the second terminal.

In step S210, a network connection may be established between the first terminal and the second terminal acting as a root node, and the second physical address information of the external device connected to the second terminal may be acquired by means of the network connection interface between the first terminal and the second terminal. It should be noted that the network connection between the first terminal and the second terminal may be either a wired connection or a wireless connection. The network connection between the first terminal and the second terminal are not limited thereto in the present embodiment, and an appropriate connection type may be selected according to the actual situation.

In step S230', the second physical address information of the external device broadcasted by the second terminal may be acquired.

In the present embodiment, another approach for acquiring the second physical address information is provided, in which the first terminal receives a beacon frame broadcasted by the second terminal and parses the beacon frame to obtain the second physical address information.

It should be noted that steps S230 and S230' are two approaches for acquiring the second physical address information, with the execution order thereof being not limited; and one of the approaches for acquiring the second physical address information may be selected according to the actual situation.

In step S240, it may be determined whether the second physical address information of the external device corresponding to the network to which the first terminal belongs is the same as the first physical address information.

In step S250, if the second physical address information is the same as the first physical address information, it may be determined that a node conflict exists as the conflict detection result of the network to which the first terminal belongs.

Furthermore, it may be determined whether the second physical address information of the external device corresponding to the network to which the first terminal belongs is the same as the first physical address information. If the second physical address information is the same as the first physical address information, it may be determined that a node conflict exists as the conflict detection result of the network to which the first terminal belongs. If the second physical address information is different from the first physical address information, it may be determined that no node conflict exists as the conflict detection result of the network to which the first terminal belongs.

Figure 5:
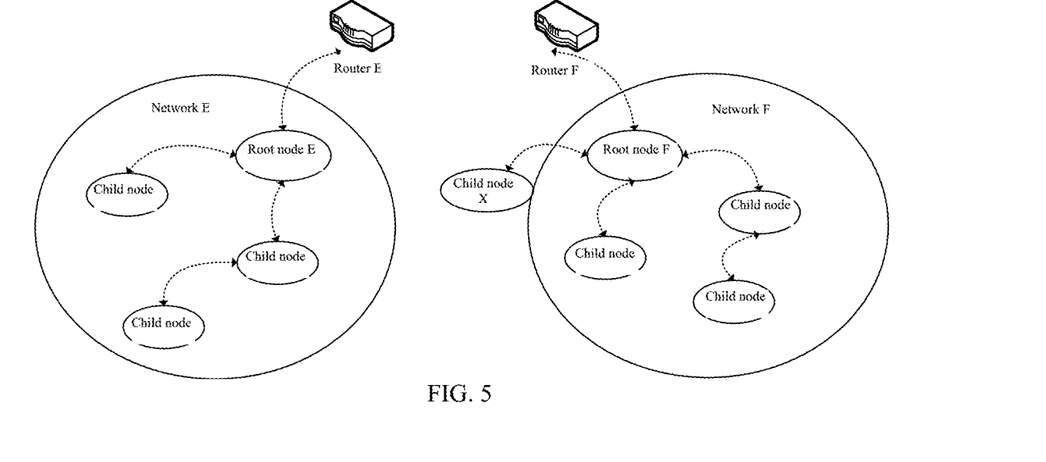
FIG. 5 is a schematic diagram of another wireless mesh network provided in the second embodiment of the present disclosure.

FIG. 5 is a schematic diagram of another wireless mesh network provided in the second embodiment of the present disclosure. The first terminal is a child node X as shown in FIG. 5. When joining a network F, the child node X may scan and find a root node E in a network E to generate a node conflict detection instruction. The child node X receives a first beacon frame broadcasted by the root node E, and parses the first beacon frame to obtain the first physical address information of a router E connected with the root node E. Then, the child node X acquires the second physical address information of a router F corresponding to the network F to which the first terminal belongs. Then, the child node X determines whether the first physical address information is the same as the second physical address information, as shown in FIG. 5, if the first physical address information and the second physical address information of the router E are different, this means that the router E and the router F are two routers with completely different physical address information, that is, the case that two root nodes are connected to one router do not exist, and thus a root node conflict does not exist in the network to which the first terminal belongs. It should be noted that in the wireless mesh network described in FIG. 5, the child nodes in the network F and the network E cannot scan and find each other before the child node X joins the network F.

Figure 6:
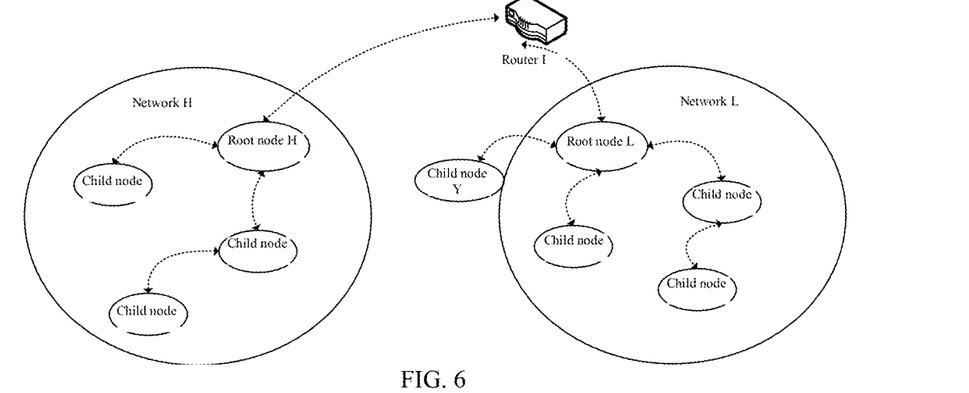
FIG. 6 is a schematic diagram of another wireless mesh network provided in the second embodiment of the present disclosure.

FIG. 6 is a schematic diagram of another wireless mesh network provided in the second embodiment of the present disclosure. The first terminal is a child node Y as shown in FIG. 6. When joining the network L, the child node Y may scan and find a root node H in a network H at the same time to generate a node conflict detection instruction. The child node Y receives a first beacon frame broadcasted by the root node H, and parses the first beacon frame to obtain the first physical address information of a router I connected with the root node H. Then, the child node Y acquires the second physical address information of the router I corresponding to the network L to which the first terminal belongs. The child node Y determines whether the first physical address information is the same as the second physical address information, as shown in FIG. 6, if the first physical address information and the second physical address information of the router I are the same, it means that the first physical address information and the second physical address information correspond to one router, that is, a root node H and a root node L are connected to one router I, indicating two root nodes exist in the wireless mesh network formed by one router I, therefore, it may be determined that a root node conflict exists as the conflict detection result of the network to which the first terminal belongs.

According to the node conflict detection method provided by the embodiment of the present disclosure, firstly, if a network connection established between the first terminal and a second terminal acting as a root node is detected, a node conflict detection instruction may be generated and first physical address information of an external device broadcasted by a third terminal acting as a root node is acquired. Then, whether the second physical address information of the external device corresponding to the network to which the first terminal belongs is the same as the first physical address information may be determined. If the second physical address information is the same as the first physical address information, it may be determined that a node conflict exists as the conflict detection result of the network to which the first terminal belongs. According to the technical solution provided by the embodiments, after a received instruction is detected, second physical address information of an external device corresponding to the network to which the first terminal belongs is compared with first physical address information of an external device corresponding to a node outside the network to which the first terminal belongs to determine whether a node conflict exists in the network to which the first terminal belongs, thereby implementing effective root node conflict detection in a wireless mesh network.

Third Embodiment

Figure 7:
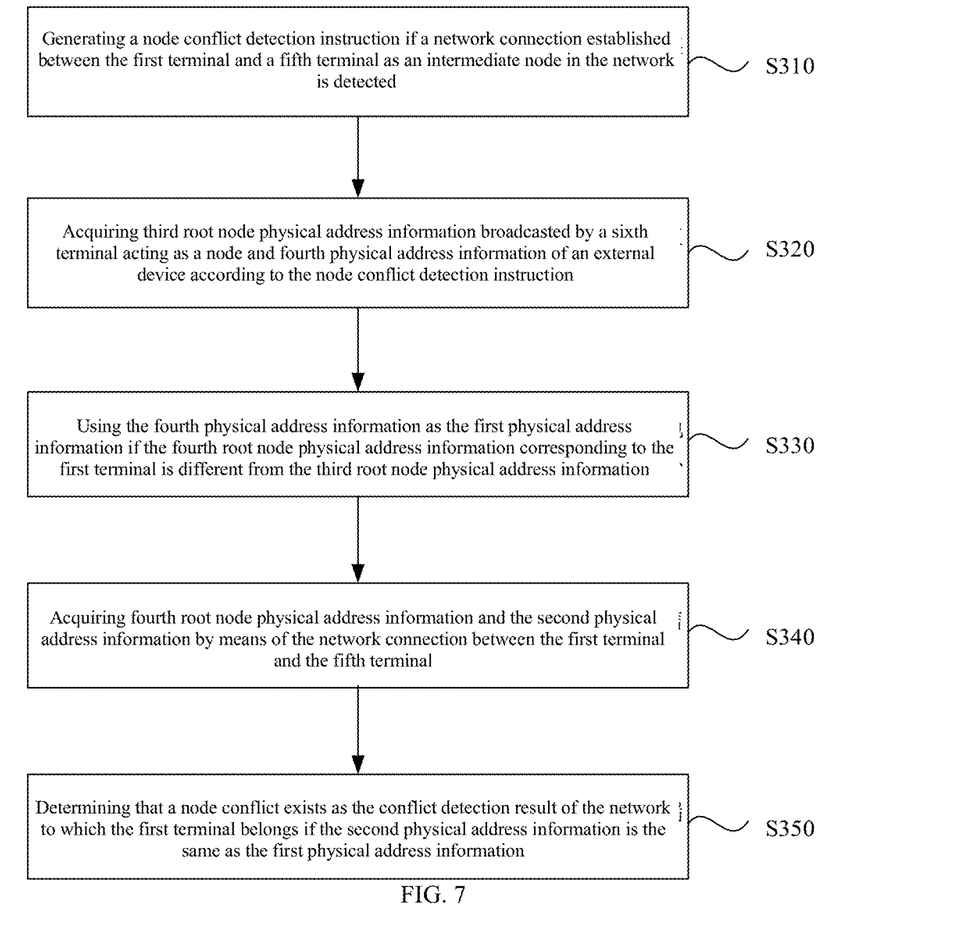
FIG. 7 is a flow chart of a node conflict detection method provided in a third embodiment of the present disclosure.

FIG. 7 is a flow chart of a node conflict detection method provided in a third embodiment of the present disclosure. The node conflict detection method is further optimized in the present embodiment on the basis of the above embodiments. As shown in FIG. 7, the optimized node conflict detection method mainly includes the following steps:

In step S310, a node conflict detection instruction is generated if a network connection established between the first terminal and a fifth terminal acting as an intermediate node in the network to which the first terminal belongs is detected.

In the present embodiment, the intermediate node may be understood as a node with forwarding function in the whole wireless mesh network, which receives data sent from a root node and forwards the data to a leaf node, and also receives data of a leaf node and forwards the data to the root node. The fifth terminal is an intermediate node in the wireless mesh network. In the present embodiment, the first terminal is preferably a device that joins a wireless mesh network by means of an intermediate node, that is, the first terminal refers to a device that establishes a network connection with an intermediate node and is a child node of the intermediate node. It should be noted that the first terminal may be either a leaf node or an intermediate node. Whether the first terminal is a leaf node or an intermediate node depends on the properties of the first terminal itself.

In the present embodiment, detecting a network connection between the first terminal and the fifth terminal acting as an intermediate node may be understood as that the first terminal generates a node conflict detection instruction to detect whether a root node conflict occurs in a wireless mesh network when it is detected that the first terminal joins the wireless mesh network by means of the fifth terminal.

In step S320, third root node physical address information broadcasted by a sixth terminal acting as a node and fourth physical address information of an external device may be acquired according to the node conflict detection instruction.

It should be noted that the intermediate node in the wireless mesh network broadcasts a beacon frame at a preset time interval, which carries the physical address information of the router connected with the root node as well as the physical address information of the root node, and the sixth terminal may be either an intermediate node device or a root node device in the wireless mesh network. It should be noted that the first terminal may scan and find a beacon frame broadcasted by the sixth terminal.

Furthermore, in the present embodiment, the second beacon frame broadcasted by the sixth terminal acting as a node is received and parsed to obtain the third root node physical address information and the fourth physical address information of the external device.

Furthermore, in the present embodiment, if the first terminal does not acquire a second beacon frame broadcasted by the sixth terminal, it is determined that the first terminal cannot scan and find the sixth terminal, and thus a root node conflict does not exist in the network to which the first terminal belongs.

In step S330, the fourth physical address information may be used as a first physical address information if the fourth root node physical address information corresponding to the first terminal is different from the third root node physical address information.

In the present embodiment, since the first terminal accesses the wireless mesh network by means of an intermediate node, it should be determined firstly whether the fourth root node physical address information corresponding to the first terminal is the same as the third root node physical address broadcasted by the sixth terminal. If the fourth root node physical address information corresponding to the first terminal is the same as the third root node physical address information, it means that the first terminal and the sixth terminal belong to the same wireless mesh network, that is, the first terminal and the sixth terminal are connected to one root node, and the wireless mesh network has only one root node. Therefore, a root node conflict does not exist.

If the fourth root node physical address information corresponding to the first terminal is different from the third root node physical address information, it should be further determined whether the third physical address information carried by the second beacon frame broadcasted by the sixth terminal is the same as the second physical address information, so as to determine whether a root node conflict exists in the wireless mesh network.

In step S340, the fourth root node physical address information and the fourth physical address information may be acquired by means of the network connection between the first terminal and the fifth terminal.

In step S310, a network connection may be established between the first terminal and the fifth terminal acting as an intermediate node, the fourth root node physical address information of the root node connected with the fifth terminal as well as the fourth physical address information of the connected external device may be acquired by means of a network connection interface between the first terminal and the fifth terminal. It should be noted that the network connection between the first terminal and the fifth terminal may be either a wired connection or a wireless connection. The network connection type between the first terminal and the sixth terminal is not limited in the present embodiment, and an appropriate connection type may be selected according to the actual situation.

In step S340', a third beacon frame broadcasted by the fifth terminal may be received. The third beacon frame is parsed to obtain the fourth root node physical address information and the second physical address information.

In the present embodiment, another method for acquiring the fourth root node physical address information and the second physical address information may be provided: the first terminal receives a beacon frame broadcasted by the fifth terminal and parses the beacon frame to obtain the fourth root node physical address information and the second physical address information.

It should be noted that steps S340 and S340' are two approaches for acquiring the fourth root node physical address information and the second physical address information, with the execution order thereof being not limited, and one of the approaches may be selected according to the actual situation.

In step S350, if the second physical address information is the same as the first physical address information, it may be determined that a node conflict exists as the conflict detection result of the network to which the first terminal belongs.

Furthermore, it may be determined whether the second physical address information of the external device corresponding to the network to which the first terminal belongs is the same as the first physical address information. If the second physical address information is the same as the first physical address information, it may be determined that a node conflict exists as the conflict detection result of the network to which the first terminal belongs. If the second physical address information is different from the first physical address information, it may be determined that no node conflict exists as the conflict detection result of the network to which the first terminal belongs.

Figure 8:
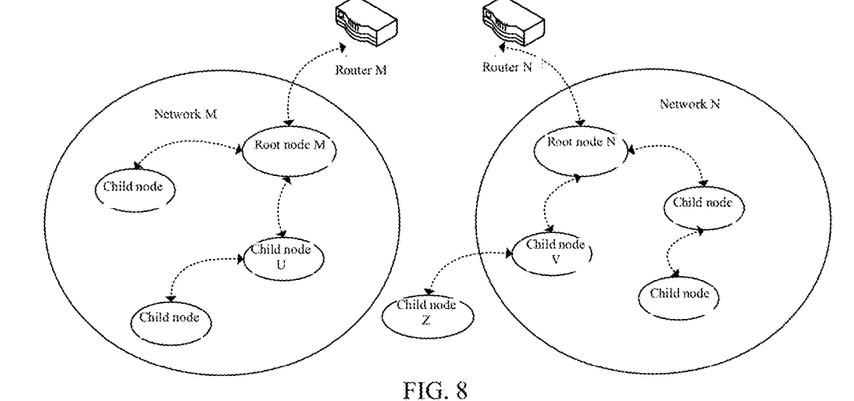
FIG. 8 is a schematic diagram of another wireless mesh network provided in the third embodiment of the present disclosure.

FIG. 8 is a schematic diagram of another wireless mesh network provided in the third embodiment of the present disclosure. The first terminal is a child node Z as shown in FIG. 8. When joining the network N by connecting with a child node V, the child node Z may scan and find a child node U in a network M at the same time to generate a node conflict detection instruction. The child node Z receives a second beacon frame broadcasted by the child node U and parses the second beacon frame to obtain the third root node physical address information of a root node M connected with the child node U and the first physical address information of a router M connected with the root node M. Then the child node Z acquires the fourth root node physical address information of the child node V and the second physical address information of a router N connected with a root node N. First, whether the third root node physical address information is the same as the fourth root node physical address information may be determined. If the fourth root node physical address information of a root node N is the same as the third root node physical address information of the root node M, it means that the root node M and the root node N are the same device, and the wireless mesh network has only one root node. Therefore, a root node conflict does not exist.

If the fourth root node physical address information of the root node N is different from the third root node physical address information of the root node M, then the child node Z determines whether the first physical address information is the same as the second physical address information, as shown in FIG. 8, if the first physical address information of the router M is different from the second physical address information of the router N, the router M and the router N are two routers with different physical address information, and there are not two root nodes connected to one router. Therefore, it may be determined that a root node conflict does not exist in the network to which the first terminal belongs. It should be noted that in the wireless mesh network described in FIG. 8, the child nodes in the network M and the network N cannot scan and find each other before the child node Z joins the network N.

Figure 9:
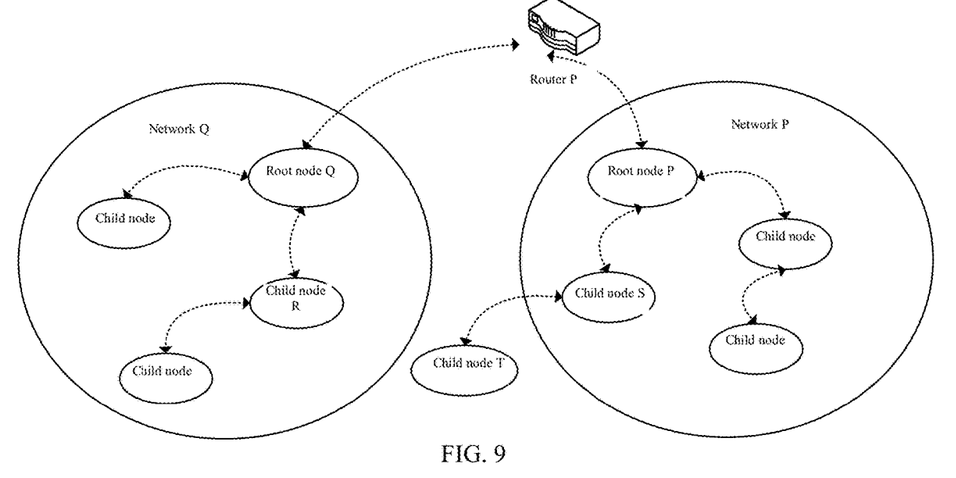
FIG. 9 is a schematic diagram of another wireless mesh network provided in the third embodiment of the present disclosure.

FIG. 9 is a schematic diagram of another wireless mesh network provided in the third embodiment of the present disclosure. The first terminal is a child node T as shown in FIG. 9. When joining the network P by connecting with a child node S, the child node T may scan and find a child node R in the network Q at the same time to generate a node conflict detection instruction. The child node T receives a second beacon frame broadcasted by the child node R and parses the second beacon frame to obtain the third root node physical address information of a root node Q connected with the child node R and the first physical address information of a router P connected with the root node Q. Then the child node T acquires the fourth root node physical address information of the child node S and the fourth physical address information of the router P connected with a root node P. First, whether the fourth root node physical address information is the same as the third root node physical address information should be determined. If the fourth root node physical address information of the root node P is the same as the third root node physical address information of the root node Q, it means that the root node Q and root node P are the same device, and the wireless mesh network has only one root node. Therefore, a root node conflict does not exist.

If the fourth root node physical address information of the root node P is different from the third root node physical address information of the root node Q, then the child node T determines whether the first physical address information is the same as the second physical address information. As shown in FIG. 9, the first physical address information and the second physical address information of the router P are the same, indicating that the first physical address information and the second physical address information correspond to one router. That is, the root node P and the root node Q are connected to one router P, and two root nodes exist in the wireless mesh network formed by one router P. Therefore, it may be determined that a root node conflict exists as the conflict detection result of the network to which the first terminal belongs.

According to the node conflict detection method provided by the embodiment of the present disclosure, firstly, if a network connection established between the first terminal and a fifth terminal acting as an intermediate node in the network to which the first terminal belongs is detected, a node conflict detection instruction is generated and the first root node physical address information broadcasted by the fifth terminal acting as an intermediate node as well as the third physical address information of the external device is acquired. If the second root node physical address information corresponding to the first terminal is different from the first root node physical address information, the third physical address information is used as the first physical address information. If the second physical address information is the same as the first physical address information, it may be determined that a node conflict exists as the conflict detection result of the network to which the first terminal belongs. According to the technical solution provided by the embodiments, after a received instruction is detected, second physical address information of an external device corresponding to the network to which the first terminal belongs is compared with first physical address information of an external device corresponding to a node outside the network to which the first terminal belongs to determine whether a node conflict exits in the network to which the first terminal belongs, thereby implementing effective root node conflict detection in a wireless mesh network.

Fourth Embodiment

Figure 10:
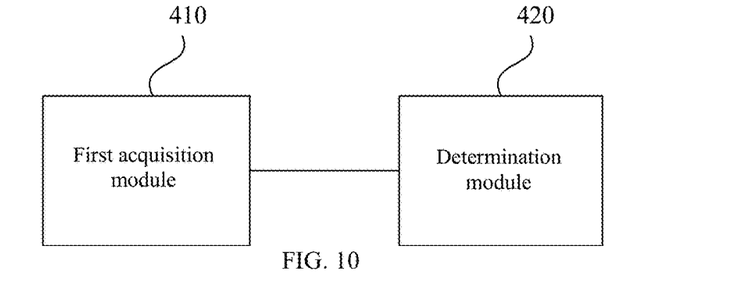
FIG. 10 is a schematic diagram of a node conflict detection apparatus provided in a fourth embodiment of the present disclosure.

The present embodiment of the present disclosure, with a schematic diagram of a node conflict detection apparatus shown in FIG. 10, may be applicable to the root node conflict detection in a wireless mesh network, in which the apparatus is configured in a first terminal acting as a node in the wireless mesh network. As shown in FIG. 10, the apparatus mainly includes:

a first acquisition module 410 configured to, if a node conflict detection instruction is detected, acquire first physical address information of an external device corresponding to a node outside the network to which the first terminal belongs, and a determination module 420 configured to determine a conflict detection result of the network to which the first terminal belongs according to second physical address information of an external device corresponding to the network to which the first terminal belongs and the first physical address information.

According to the node conflict detection apparatus provided by the embodiment of the present disclosure, first, if a node conflict detection instruction is detected, first physical address information of an external device corresponding to a node outside the network to which the first terminal belongs is acquired, and then a conflict detection result of the network to which the first terminal belongs is determined according to second physical address information of an external device corresponding to the network to which the first terminal belongs and the first physical address information. According to the technical solution provided by the embodiments, after a received instruction is detected, second physical address information of an external device corresponding to the network to which the first terminal belongs is compared with first physical address information of an external device corresponding to a node outside the network to which the first terminal belongs to determine whether a node conflict exists in the network to which the first terminal belongs, thereby implementing effective root node conflict detection in a wireless mesh network.

Furthermore, the determination module 420 includes:

a determination unit configured to determine whether the second physical address information of the external device corresponding to the network to which the first terminal belongs is the same as the first physical address information; and a first determination unit configured to, if the second physical address information is the same as the first physical address information, determine that a node conflict exists as the conflict detection result of the network to which the first terminal belongs.

Furthermore, the first acquisition module 410 includes:

a first generation unit configured to generate a node conflict detection instruction if a network connection established between the first terminal and a second terminal acting as a root node is detected; and a first acquisition unit configured to acquire first physical address information of an external device broadcasted by a third terminal acting as a root node according to the node conflict detection instruction.

Furthermore, the first acquisition module 410 further includes:

a first generation unit, further configured to generate a node conflict detection instruction if a network connection established between the first terminal and a second terminal acting as a root node is detected;

a first acquisition unit, further configured to acquire third physical address information of an external device broadcasted by a fourth terminal acting as an intermediate node and first root node physical address information according to the node conflict detection instruction, in which the first root node physical address information is root node physical address information of a network to which the fourth terminal belongs; and a physical address determination unit configured to use the third physical address information as the first physical address information if second root node physical address information corresponding to the first terminal is different from the first root node physical address information.

Specifically, the first acquisition unit is configured to receive a first beacon frame broadcasted by a third terminal acting as a root node; and parse the first beacon frame to obtain first physical address information of the external device.

Furthermore, the apparatus further includes a second acquisition module configured to acquire second physical address information of an external device connected to the second terminal by means of the network connection between the first terminal and the second terminal; or, a third acquisition module configured to acquire second physical address information of an external device broadcasted by the second terminal.

Furthermore, the first acquisition module includes a second generation unit and a second acquisition unit, a second generation unit configured to generate a node conflict detection instruction if a network connection established between the first terminal and a fifth terminal acting as an intermediate node in the network is detected;

a second acquisition unit configured to acquire physical address information of a third root node broadcasted by a sixth terminal acting as a node and fourth physical address information of an external device according to the node conflict detection instruction; and a second determination unit configured to use fourth physical address information as the first physical address information if the physical address information of the fourth root node corresponding to the first terminal is different from the third root node physical address information.

Specifically, the second acquisition unit is configured to receive a second beacon frame broadcasted by a sixth terminal acting as a node; parse the second beacon frame to obtain third root node physical address information and the fourth physical address information of the external device.

Furthermore, the apparatus further comprises a fourth acquisition module configured to acquire fourth root node physical address information and the second physical address information by means of the network connection between the first terminal and the fifth terminal; or, a fifth acquisition module configured to receive a third beacon frame broadcasted by a fifth terminal; and parse the third beacon frame to obtain fourth root node physical address information and the second physical address information.

The node conflict detection apparatus provided by the embodiment of the present disclosure may implement the node conflict detection method provided by any embodiment of the present disclosure, and has corresponding functional modules and advantageous effects of the implementing method.

Fifth Embodiment

Figure 11:
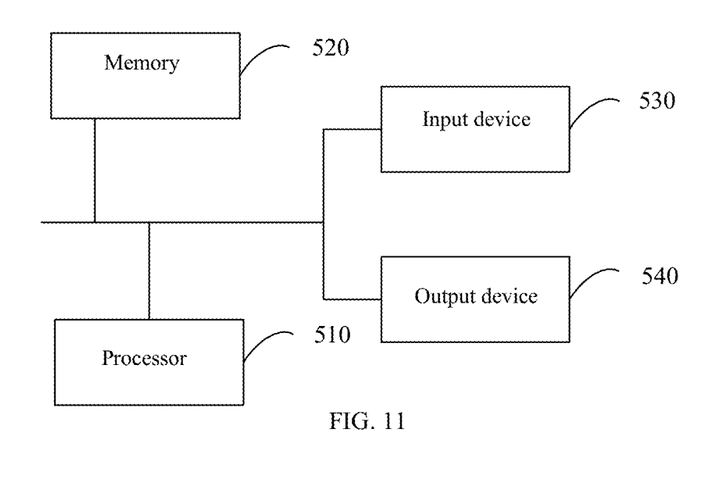
FIG. 11 is a schematic diagram of a terminal provided in a fifth embodiment of the present disclosure.

FIG. 11 is a schematic diagram of a terminal provided in Example 5 of the present disclosure. As shown in FIG. 11, the terminal may include a processor 510, a memory 520, an input device 530 and an output device 540. Though one processor 510 is illustrated as an example in FIG. 11, the terminal may include one or more processors 510. The processor 510, the memory 520, the input device 530, and the output device 540 in the terminal may be connected via a bus, for example, in FIG. 11 or via other means.

The memory 520 is a computer readable storage medium that may be used to store software programs, computer executable programs and modules, for example, program instructions/modules corresponding to the node conflict detection method in the embodiment of the present disclosure (e.g., a first acquisition module 410 and a determination module 420 in the node conflict detection apparatus). The processor 510 executes various functional applications and data processing of the terminal by running software programs, instructions and modules stored in the memory 520, i.e., implements the above node conflict detection method.

The memory 520 may mainly include a program storage area and a data storage area, wherein the program storage area may store application programs required by an operating system and at least one function; and the data storage area may store data created according to the use of the terminal. In addition, the memory 520 may include high-speed random access memory, and may also include non-volatile memory, for example, at least one magnetic disk storage device, a flash memory device, or other non-volatile solid-state memory devices. In some embodiments, the memory 520 may further include memories remotely located with respect to the processor 510, and these remote memories may be connected to the terminal via a network. Examples of the networks may include, but are not limited to, the Internet, Intranet, local area network (LAN), Mobile Communication Network, and a combination thereof.

The input device 530 may be used to receive inputted digital or character information, and generate key signal input related to user setting and function control of the terminal. The output device 540 may comprise a display device such as a display screen.

Sixth Embodiment

A sixth embodiment of the present disclosure further provides a storage medium containing computer executable instructions which are used by a computer processor to implement a node conflict detection method applied to a first terminal acting as a node in a wireless mesh network. The method includes:

if a node conflict detection instruction is detected, acquiring first physical address information of an external device corresponding to a node outside the network to which the first terminal belongs; and determining a conflict detection result of the network to which the first terminal belongs according to second physical address information of an external device corresponding to the network to which the first terminal belongs and the first physical address information.

Of course, for the storage medium containing computer executable instructions provided by the embodiment of the present disclosure, the computer executable instructions are not limited to the above method operations, and relevant operations in the node conflict detection method provided by any embodiment of the present disclosure can also be executed.

From the above description of the embodiments, it is clear to those skilled in the art that the present disclosure can be implemented with the aid of software and necessary general-purpose hardware, or of course by hardware, but the former is a better implementation in many cases. Based on this understanding, the technical solution of the present disclosure, which essentially or rather contributes to the prior art, can be embodied in the form of a software product, which can be stored in a computer readable storage medium, for example, a computer floppy disk, Read-Only Memory (ROM), Random Access Memory (RAM), FLASH, hard disk or CD-ROM, and includes a number of instructions to cause a computer device (which may be a personal computer, a server, or a network device) to implement the method described in various embodiments of the present disclosure.

It is worth noting that in the embodiment of the node conflict detection apparatus, each unit and module included is divided according to functional logic, but it is not limited to the above division, as long as the corresponding functions can be implemented. In addition, the specific names of the functional units are only for the convenience of distinguishing each other, and are not used to limit the scope of protection of the present disclosure.

It should be noted that the above description is only the preferred embodiment of the present disclosure and the applied technical principle. It should be understood by those skilled in the art that the present disclosure is not limited to the particular embodiment described herein, and that various obvious variations, readjustments and substitutions can be made by those skilled in the art without departing from the scope of the present disclosure. Therefore, although the present disclosure has been illustrated in more detail by the above embodiments, the present disclosure is not limited to the above embodiments, but may also include more other equivalent embodiments without departing from the inventive concept, and the scope of the present disclosure is determined by the scope of the appended claims.

The invention claimed is:

1. A node conflict detection method, applied to a first terminal acting as a node in a wireless mesh network, comprising steps of:

when a node conflict detection instruction is detected, acquiring first physical address information of an external device corresponding to a node outside a network to which the first terminal belongs; wherein the node conflict detection instruction refers to an instruction for the first terminal to detect whether there is a root node conflict in the network to which the first terminal belongs; and determining a conflict detection result of the network to which the first terminal belongs according to second physical address information of an external device corresponding to the network to which the first terminal belongs and the first physical address information;

wherein a step of, when the node conflict detection instruction is detected, acquiring the first physical address information of the external device corresponding to the node outside the network to which the first terminal belongs comprises:

generating the node conflict detection instruction when a network connection established between the first terminal and a second terminal acting as one root node is detected; and acquiring first physical address information of an external device broadcasted by a third terminal acting as one root node according to the node conflict detection instruction.

2. The method according to claim 1, wherein a step of determining the conflict detection result of the network to which the first terminal belongs according to the second physical address information of the external device corresponding to the network to which the first terminal belongs and the first physical address information comprises:

determining whether the second physical address information of the external device corresponding to the network to which the first terminal belongs is the same as the first physical address information; and when it is determined the second physical address information is the same as the first physical address information, determining that a node conflict exists as the conflict detection result of the network to which the first terminal belongs.

3. The method according to claim 1, the method further comprising, after generating the node conflict detection instruction, acquiring third physical address information of an external device broadcasted by a fourth terminal acting as an intermediate node according to the node conflict detection instruction and first root node physical address information, wherein the first root node physical address information is root node physical address information of a network to which the fourth terminal belongs; and using the third physical address information as the first physical address information when second root node physical address information corresponding to the first terminal is different from the first root node physical address information.

4. The method according to claim 1, wherein a step of acquiring the first physical address information of the external device broadcasted by the third terminal acting as one root node comprises:
   receiving a first beacon frame broadcasted by the third terminal acting as one root node; and
   parsing the first beacon frame to obtain the first physical address information of the external device.

5. The method according to claim 1, further comprising:
   acquiring the second physical address information of an external device connected to the second terminal by means of the network connection between the first terminal and the second terminal; or,
   acquiring the second physical address information of an external device broadcasted by the second terminal.

6. The method according to claim 1, wherein when the node conflict detection instruction is detected, acquiring the first physical address information of the external device corresponding to the node outside the network to which the first terminal belongs comprises:
   generating the node conflict detection instruction when a network connection established between the first terminal and a fifth terminal acting as an intermediate node in the network is detected;
   acquiring third root node physical address information broadcasted by a sixth terminal acting as a node and fourth physical address information of an external device according to the node conflict detection instruction; and
   using the fourth physical address information as the first physical address information when the fourth root node physical address information corresponding to the first terminal is different from the third root node physical address information.

7. The method according to claim 6, wherein a step of acquiring the third root node physical address information broadcasted by the sixth terminal acting as the node and fourth physical address information of the external device comprises:
   receiving a second beacon frame broadcasted by the sixth terminal acting as the node;
   parsing the second beacon frame to obtain the third root node physical address information and the fourth physical address information of the external device.

8. The method according to claim 6, further comprising:
   acquiring the fourth root node physical address information and the second physical address information by means of the network connection between the first terminal and the fifth terminal; or,
   receiving a third beacon frame broadcasted by the fifth terminal; and
   parsing the third beacon frame to obtain the fourth root node physical address information and the second physical address information.

9. A first terminal, comprising:
   one or more processors; and
   a storage device, configured for storing one or more programs,
   when the one or more programs being executed by the one or more processors, causing the one or more processors to carry out the node conflict detection method according to claim 1.

10. A non-transitory computer readable storage medium, storing a computer program thereon, when the program being executed by one or more processors, causing the one or more processors to carry out the node conflict detection method according to claim 1.

* * * * *